UNITED STATES PATENT OFFICE.

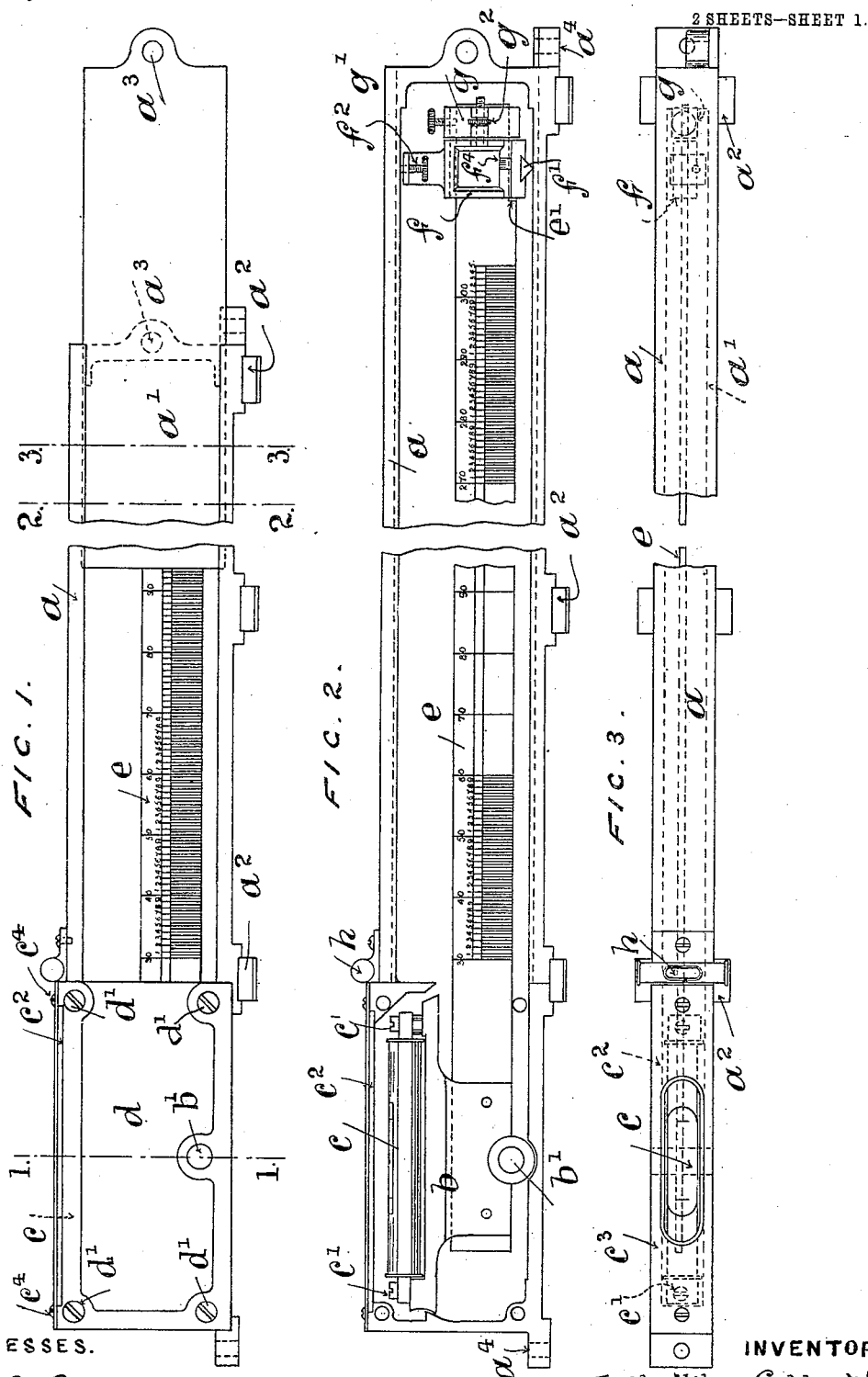

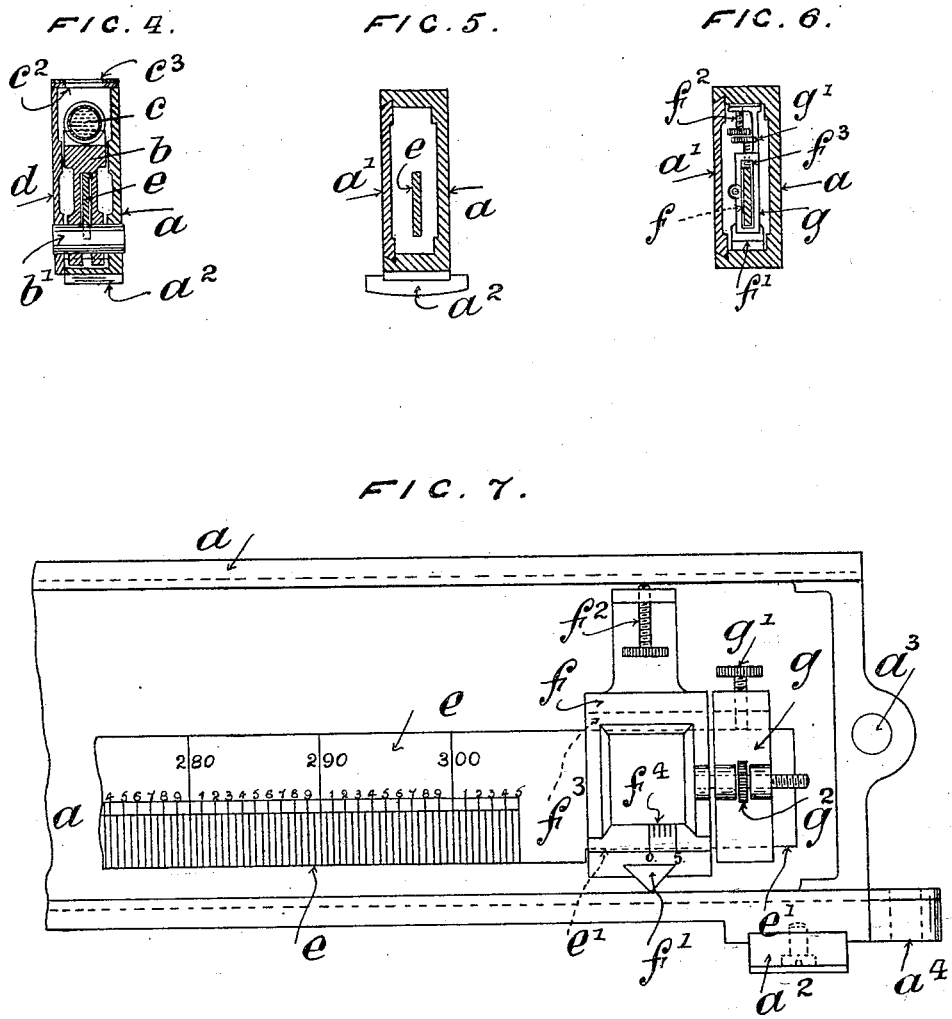

JOSEPH MILNER LOCKHART AND HERBERT JOHN JENKINSON, OF MANCHESTER, ENGLAND.

APPARATUS FOR BONING OR LAYING DRAIN-PIPES.

961,244.  Specification of Letters Patent.  Patented June 14, 1910.

Application filed October 30, 1909. Serial No. 525,587.

*To all whom it may concern:*

Be it known that we, JOSEPH MILNER LOCKHART, pattern-maker, and HERBERT JOHN JENKINSON, surveyor, subjects of the King of Great Britain and Ireland, residing, respectively, at 5 and 7 Gloucester road, Pendleton, Manchester, in the county of Lancaster, England, have invented new and useful Improvements in Appliances to be Used in Boning or Laying Drain or other Pipes, &c., to a Desired Fall or Gradient, of which the following is a specification.

Our said invention relates to an improved appliance suitable for use in the "boning" or laying of drain or other pipes to a desired fall or gradient. The appliance, with or without modification, is equally well adapted for use in the setting down or fixing of railway and tramway rails, and generally where it is desired to indicate a grade.

Our improved appliance or instrument embodies a spirit level which, the gradient or desired fall being known, or ascertained in the ordinary fashion, can be set to correspond with that, whereby when the drain pipe lies at the desired angle, and the appliance or instrument is applied, a true level will be denoted.

In our appliance a rockable or oscillating level works in connection with shiftable denoting means carried on a graduated longitudinal scale, which shiftable means enable the level to be thrown out to an amount commensurate with the degree of any denoted fall or gradient, whereby when the drain pipe lies at the desired angle the amount the level was formerly thrown out is corrected and a true level indicated.

The construction of our instrument is illustrated in the attached two sheets of drawings, and is hereafter described in detail.

In the said drawings:—Figure 1 is a side elevation of the instrument, broken in length and with the slidable cover partly withdrawn. Fig. 2 shows the instrument in side elevation with the slidable cover entirely withdrawn. Fig. 3 is a plan view. Fig. 4 is a transverse section on the line 1—1 Fig. 1. Fig. 5 shows a section on the line 2—2 Fig. 1. Fig. 6 is a section on the line 3—3 Fig. 1 and shows the cursor in full. Fig. 7 is a fragmentary view, and shows the end of the graduated scale and the cursor more clearly.

In instruments in accordance with our invention we use an elongated metal casing or container $a$ with a movable lid or cover. Preferably we use a slidable lid $a'$ moving in under-cut channels, as Fig. 5 shows. The casing $a$ is narrow in cross-section, and is as light in weight as possible and we prefer to make it of nickel aluminium. We provide the casing with case-hardened steel feet $a^2$ screwed or attached to the base of the casing. These feet are curved so as to fit, and, when the instrument is in use, rest on the "invert" of the pipe. The situation of the feet in the drawings is such as to suit pipes of 2 foot or 2 foot 6 inches diameter.

At one end of the casing $a$ is mounted a rockable device or swivel block $b$ working on a hardened pivot stud $b'$ (or other pivotal support) and this carries a spirit level $c$ attached by screws at $c'$ $c'$ or otherwise. The face of this spirit level can be seen from the top of the casing. Conveniently a glass cover is fitted, marked $c^2$, and this is held down by a screwed on plate $c^3$, which shrouds and protects the spirit level, the plate being fixed by screws $c^4$. For convenience in fitting the rockable device or swivel block $b$, a removable cover plate $d$ is used on one side and is attached to the casing by screws $d', d', d', d'$. On the rockable device or swivel block $b$, and so attached that its base line coincides with the center of the pivot stud $b'$, is a scale $e$, and this is graduated into units, for example into 10th of one inch divisions. The scale shown in the drawings is marked off into one inch divisions starting from the center of movement. The first graduation mark shown thereon from the center of movement is 30, and thereafter each inch division is divided into ten parts or units, and each unit is sub-divided into halves to enable a reading down to a half unit or .5 to be got. The scale is shown as graduated something over a distance of 30 inches.

Embracing or sliding on the graduated scale $e$, is what may be described as a cursor or traveling setting gage $f$, which has a hardened steel die or part $f'$ to contact with the floor of the casing $a$ (see Figs. 2 and 7).

The scale $e$, at its extreme end, is checked out at $e'$, or reduced in depth, or so shaped, as to allow the cursor $f$ and die $f'$ to rise or be lifted with respect to the face of the scale a distance equivalent to the unit (in the instrument illustrated to the extent of $\frac{1}{10}$th of an inch) and when occupying a position on the reduced end, and with the scale depressed and the die resting on the floor of the casing, the bubble of the spirit level would denote that the scale lies in a truly horizontal plane with regard to said level. The cursor or gage $f$ is arranged to slide on the scale $e$ and has a gap or slot $f^3$ of such dimensions, where it engages the scale, as will just allow of its being pushed onto the scale and of its being slidably moved along. A pinching screw $f^2$ or other device, is fitted to the cursor or gage to clamp the same by contacting with the inside of the casing, and a sliding clamp $g$ with pinching screw $g'$ is fitted for a purpose to be later explained. When the scale $e$ is tilted sufficiently to allow the pushing of the cursor or gage $f$ onto the scale, and clear of the checked-out portion $e'$, the spirit level is tilted or rocked to the extent of the unit, which is $\frac{1}{10}$ in the length of the scale $e$, and a continued movement of the cursor toward the left-hand end influences the level to a corresponding extent. This cursor has a setting mark coinciding with the apex point of the die, that is, midway of its width as shown. Supposing the cursor or gage is shifted, and the setting mark points to 300, then the level is 1 in 300 out, and an inclination to correspond, in the lie of a drain pipe, will correct this, and a true level will then be readable by the position of the bubble. If the setting mark stands at the graduation midway between 140 and 141, that is, at the half unit graduation, the level is out 1 in 140.5, and so on. We may mark a small vernier scale on the beveled edge of the cursor or gage, as at $f^4$, and the sliding clamp $g$ becomes useful in that case. This clamp $g$ carries a milled nut $g^2$ which can be acted on by the finger to shift the cursor the required degree, the said milled nut traversing a small screwed spindle $g^3$ attached to the cursor $f$. Before acting on the milled nut $g^2$ it is obvious that the screw $f^2$ must be slackened and the screw $g'$ tightened. The instrument shown has a range of gradients from 1 in 30, to 1 in 305, rising in units of .1, and any intermediate figure between can be readily set to.

The way of setting and using the appliance will now be fully apparent. The surveyor or master drainer, knowing the desired fall, adjusts the cursor or gage and fixes the same in position by the screw $f^2$, slides the cover to, and locks the cover in position. This can be done by using a suitable bolt to be passed through the two bored ears $a^3$ $a^3$. As any suitable lock may be used, such lock is not shown on the drawings. The appliance when adjusted, and locked, is ready for handing to the drainer. He cannot tamper with the setting. It will be understood that the drainer has the pipe to the desired fall or gradient as soon as the bubble in the vial shows true in the contained level $e$.

We prefer to fit the casing with a small cross level $h$ whereby it can be seen when the instrument is vertically disposed and which assists in obtaining perfect alinement.

In order to enable long pipes to be dealt with we may provide feet at $a^4$ $a^4$ by which the instrument can be attached to a straight-edge of any required length.

The instrument is very useful where pipes are to be laid in a "heading".

It is clear that with or without alterations the appliance has a more extended use than with respect to the laying of pipes, as we hint at in the preamble.

We declare that what we claim is.

1. An instrument of the class described, comprising a casing, a swivel block therein, a spirit level carried by the block, a scale within said casing and having one end secured to the block and its other end free, and sliding means on said free end for oscillating the scale, said sliding means being in engagement with said casing.

2. An instrument of the class described, comprising a casing provided with an opening and movable means for closing said opening, a block swiveled in the casing, a level mounted on the block, said casing having a transparent portion above the level, a scale within said casing and having one end secured to the block and its other end free and sliding means on the other end of the scale for oscillating the same, said sliding means being in engagement with said casing.

3. An instrument of the class described, comprising a casing, a block swiveled therein, a level mounted on the block, a scale within said casing and having one end secured to the block, a traveling cursor on the scale and engaging said casing, and means for securing the cursor against movement.

4. An instrument of the class described comprising a casing, a block swiveled therein, a level mounted on the block, a scale having one end secured to the block, a traveling cursor on the scale and engaging one of the walls of the casing, means for securing the cursor against movement, and means for minutely adjusting said cursor.

5. An instrument of the class described comprising a casing, a block swiveled therein, a level mounted on the block, a scale having one end secured to the block, a traveling cursor on the scale and engaging one of the walls of the casing, means for securing the cursor against movement, and means for minutely adjusting said cursor, said means comprising a clamp movable on the scale, an adjusting screw carried by the clamp and engaging with the cursor, and a nut for the screw.

6. An instrument of the class described comprising a casing, a block swiveled at one end of the same, a level mounted on the block, a scale having one end secured to the block and its other end free and reduced in width, a cursor sliding on said scale and having a portion engaging with the bottom of the casing so that when the cursor is on the reduced portion of the scale the scale is parallel with the bottom of the casing and means for holding the cursor stationary.

In testimony whereof we have signed our names to this specification in the presence of two subscribing witnesses.

JOSEPH MILNER LOCKHART.
HERBERT JOHN JENKINSON.

Witnesses:
RICHARD IBBERSON,
NORMAN KIERNAN.